(12) United States Patent
Dunnigan et al.

(10) Patent No.: US 10,781,710 B2
(45) Date of Patent: Sep. 22, 2020

(54) SEALING CONFIGURATION TO REDUCE AIR LEAKAGE

(71) Applicant: UNITED TECHNOLOGIES CORPORATION, Farmington, CT (US)

(72) Inventors: Rebecca R. Dunnigan, Sturbridge, MA (US); Billie W. Bunting, Colchester, CT (US); Ted Guevel, West Hartford, CT (US); Randall Lee Greenberg, Oxford, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 103 days.

(21) Appl. No.: 16/037,470

(22) Filed: Jul. 17, 2018

(65) Prior Publication Data
US 2020/0025005 A1 Jan. 23, 2020

(51) Int. Cl.
*F01D 11/00* (2006.01)
*F01D 9/06* (2006.01)

(52) U.S. Cl.
CPC .............. *F01D 11/003* (2013.01); *F01D 9/06* (2013.01); *F01D 11/005* (2013.01); *F05D 2220/32* (2013.01); *F05D 2240/14* (2013.01); *F05D 2240/55* (2013.01)

(58) Field of Classification Search
CPC .......... F01D 9/06; F01D 9/065; F01D 11/003; F01D 11/005; F02C 6/08; F16C 33/043; F05D 2220/32; F05D 2240/14; F05D 2240/55; F05D 2250/611; F05D 2300/431; F05D 2300/603
See application file for complete search history.

(56) References Cited

U.S. PATENT DOCUMENTS

| | | | | |
|---|---|---|---|---|
| 3,312,448 A | * | 4/1967 | Huil, Jr. | F16C 33/76 415/175 |
| 3,596,934 A | | 8/1971 | De Cenzo | |
| 4,972,671 A | * | 11/1990 | Asselin | F01D 9/065 184/6.11 |
| 5,316,346 A | * | 5/1994 | Maurer | F16L 23/006 248/49 |
| 5,480,193 A | | 1/1996 | Echols | |

(Continued)

FOREIGN PATENT DOCUMENTS

| | | |
|---|---|---|
| FR | 3041686 | 3/2017 |
| FR | 3041686 B1 | 8/2018 |
| JP | 61253319 | 11/1986 |

OTHER PUBLICATIONS

European Patent Office, European Search Report dated Nov. 13, 2019 in Application No. 19186853.8.

*Primary Examiner* — Igor Kershteyn
(74) *Attorney, Agent, or Firm* — Snell & Wilmer L.L.P.

(57) ABSTRACT

A seal assembly for a fluid transfer tube in a gas turbine engine is disclosed. In various embodiments, the seal assembly includes a base member having a first side configured to mate with a casing and a second side opposite the first side, a housing configured to mate with the second side of the base member and to surround a portion of the fluid transfer tube, a bellows surrounding the fluid transfer tube and positioned between the housing and the casing, and a wear ring disposed between the housing and the bellows.

13 Claims, 4 Drawing Sheets

(56) References Cited

U.S. PATENT DOCUMENTS

| | | | |
|---|---|---|---|
| 5,630,700 | A | 5/1997 | Olsen et al. |
| 5,653,478 | A | 8/1997 | McGurk et al. |
| 7,278,516 | B2 * | 10/2007 | Zalewski ................ F01D 9/065 184/6.11 |
| 7,566,221 | B2 | 7/2009 | Garcia et al. |
| 8,231,142 | B2 * | 7/2012 | Olver .................... F16L 23/167 285/13 |
| 8,490,409 | B2 | 7/2013 | Pucovsky et al. |
| 8,844,976 | B2 | 9/2014 | Laubie |
| 9,506,403 | B2 | 11/2016 | Clarke |
| 9,599,261 | B2 | 3/2017 | Schimanski et al. |
| 9,644,697 | B2 | 5/2017 | Mitsch |
| 9,897,236 | B2 | 2/2018 | Li et al. |
| 2003/0110778 | A1 | 6/2003 | Karafillis |
| 2005/0199445 | A1 | 9/2005 | Zalewski |
| 2006/0123796 | A1 | 6/2006 | Aycock et al. |
| 2008/0012337 | A1 | 1/2008 | De Bosscher |
| 2013/0224011 | A1 | 8/2013 | Hashimoto |
| 2015/0219015 | A1 | 8/2015 | Szymanski |

\* cited by examiner

SEALING CONFIGURATION TO REDUCE AIR LEAKAGE

FIELD

The present disclosure relates generally to gas turbine engines and, more particularly, to bleed air systems used within gas turbine engines and the fluid transfer tubing used therein.

BACKGROUND

Gas turbine engines, such as those used to provide thrust to an aircraft, are internal combustion engines that use air as the working fluid. In general, the gas turbine engines include a fan section and a core engine located downstream of the fan section. Air from the fan section generally passes through a bypass duct for generating thrust or through the core engine for generating power used to drive the fan. The core engine generally includes a compressor section, one or more combustors, and a turbine section. During operation, air is drawn into the fan section and accelerated by rotating fan blades. A fraction of the indrawn air is routed through the core engine, where it is compressed and pressurized by rotating blades of the compressor section before entering the combustor section. In the combustor section, the air is combusted with fuel to generate hot combustion gases. The hot combustion gases expand through and drive the turbine section, which extracts energy from the gases to power the compressor and fan sections. The hot gases are then expelled through an exhaust nozzle.

SUMMARY

A seal assembly for a fluid transfer tube in a gas turbine engine is disclosed. In various embodiments, the seal assembly includes a base member having a first side configured to mate with a casing and a second side opposite the first side, a housing configured to mate with the second side of the base member and to surround a portion of the fluid transfer tube, a bellows surrounding the fluid transfer tube and positioned between the housing and the casing, and a wear ring disposed between the housing and the bellows.

In various embodiments, the fluid transfer tube defines a longitudinal axis and wherein the bellows is positioned about the fluid transfer tube and extends from a first end to a second end spaced a distance along the longitudinal axis from the first end. In various embodiments, the first end is configured to float with respect to the fluid transfer tube and wherein the second end is fixed with respect to the fluid transfer tube. In various embodiments, the first end is connected to the wear ring.

In various embodiments, the bellows is constructed of a metallic or an elastomeric material. In various embodiments, the wear ring is constructed of a composite material and includes a surface configured to wear against the housing. In various embodiments, both the base member and the housing include a plurality of holes extending there through and configured for attaching the base member and the housing to the casing via a plurality of bolts. In various embodiments, the housing includes a first section configured to house a first portion of the fluid transfer tube and a second section configured to house a second portion of the fluid transfer tube. In various embodiments, the base member is constructed of an elastomeric or a metallic material.

A transfer tube assembly for a gas turbine engine is disclosed. In various embodiments, the transfer tube assembly includes a fluid transfer tube configured to extend through a casing, a base member having a first side configured to mate with the casing and a second side opposite the first side, a housing configured to mate with the second side of the base member and to surround a portion of the fluid transfer tube, a bellows surrounding the fluid transfer tube and positioned between the housing and the casing, and a wear ring disposed between the housing and the bellows.

In various embodiments, the fluid transfer tube defines a longitudinal axis and wherein the bellows is positioned about the fluid transfer tube and extends from a first end to a second end spaced a distance along the longitudinal axis from the first end. In various embodiments, the first end is configured to float with respect to the fluid transfer tube and wherein the second end is fixed with respect to the fluid transfer tube. In various embodiments, the first end is connected to the wear ring. In various embodiments, the housing includes a first section configured to house a first side of the fluid transfer tube and a second section configured to house a second side of the fluid transfer tube.

A bleed air assembly for a gas turbine engine is disclosed. In various embodiments, the bleed air assembly includes a fluid transfer tube configured to provide compressed air from a compressor to a component external to the compressor, the fluid transfer tube having a tube portion configured to extend through a casing, a base member having a first side configured to mate with the casing and a second side opposite the first side, a housing configured to mate with the second side of the base member and to surround a portion of the fluid transfer tube, a bellows surrounding the fluid transfer tube and positioned between the housing and the casing, and a wear ring disposed between the housing and the bellows.

In various embodiments, the bellows and the wear ring are configured to enable movement of the tube portion with respect to the casing. In various embodiments, the fluid transfer tube defines a longitudinal axis and wherein the bellows is positioned about the fluid transfer tube and extends from a first end to a second end spaced a distance along the longitudinal axis from the first end. In various embodiments, the first end is configured to float with respect to the fluid transfer tube and wherein the second end is fixed with respect to the fluid transfer tube. In various embodiments, the first end is connected to the wear ring. In various embodiments, the housing includes a first section configured to house a first side of the fluid transfer tube and a second section configured to house a second side of the fluid transfer tube.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1A:
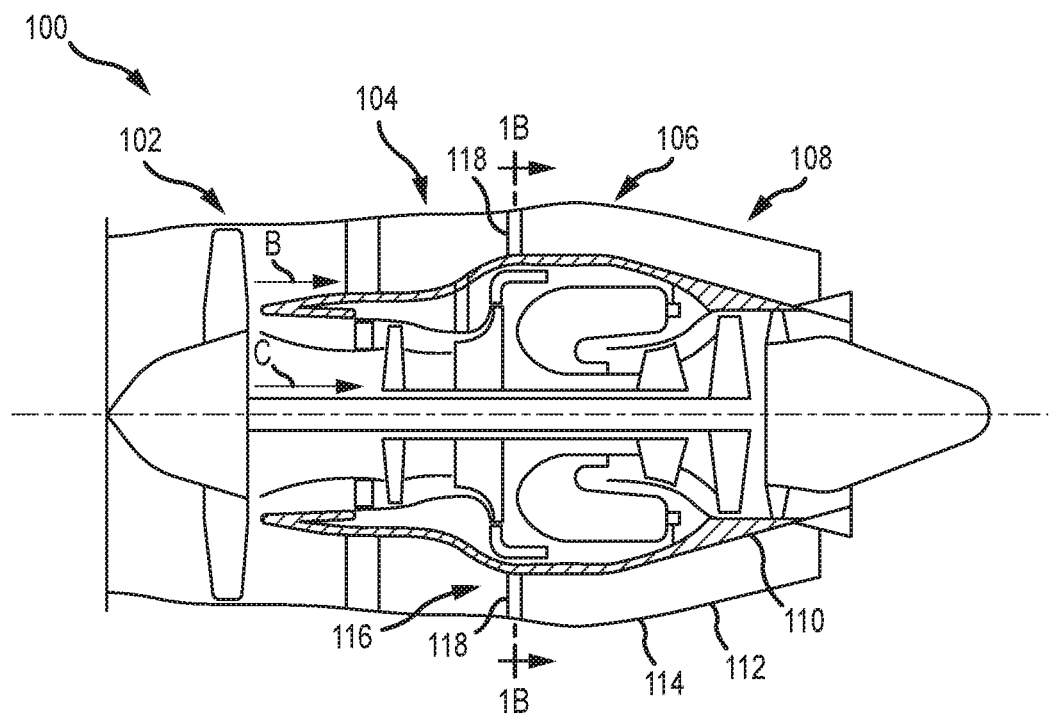
FIGS. 1A and 1B are schematic side and axial cross-sectional views, respectively, of a gas turbine engine, in accordance with various embodiments.
Figure 1B:
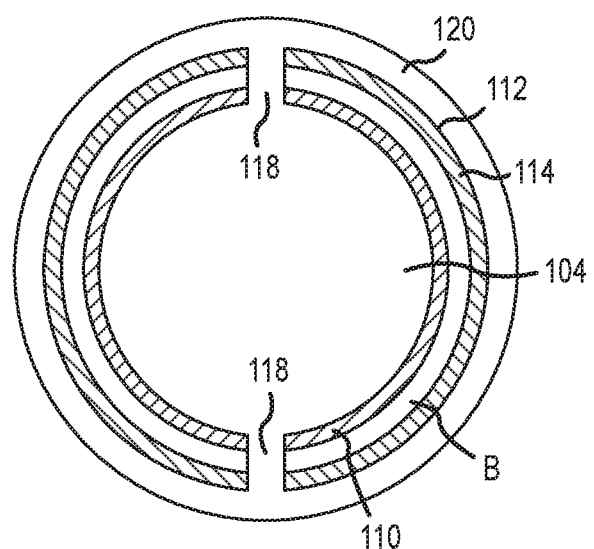

Referring now to the drawings, FIGS. 1A and 1B schematically illustrate a gas turbine engine 100, in accordance with various embodiments. The gas turbine engine 100 is disclosed herein as a two-spool turbofan that generally incorporates a fan section 102, a compressor section 104, a combustor section 106 and a turbine section 108. Alternative engines might include an augmenter section (not shown) among other systems or features. The fan section 102 drives air along a bypass duct or flow path B in a bypass duct defined between a core engine outer casing 110 and an outer bypass duct casing 112, which may also be referred to as an inner nacelle casing 114. The compressor section 104 drives air along a primary or core flow path C for compression and communication into the combustor section 106 and then expansion through the turbine section 108. Although depicted as a two-spool turbofan gas turbine engine in the disclosed non-limiting embodiment, it will be understood that the concepts described herein are not limited to use with two-spool turbofans as the teachings may be applied to other types of turbine engines, including single-spool and three-spool architectures.

Referring still to FIGS. 1A and 1B, the gas turbine engine 100 also includes a bleed air system 116, used to bleed air from points within the compressor section 104 to other components within the gas turbine engine 100. In various embodiments, the bleed air system 116 includes one or more transfer tube assemblies 118. In general, transfer tube assemblies, such as the one or more transfer tube assemblies 118 just referred, are used to transport bleed air or other fluids, such as fuel or hydraulic fluid, from one component of the gas turbine engine 100 to another. In various embodiments, the one or more transfer tube assemblies 118 may be used in conjunction with the bleed air system 116 to transport bleed air from points within the compressor section 104 to points within a nacelle 120, passing first through the core engine outer casing 110, through the bypass duct or flow path B, and then through the outer bypass duct casing 112 or inner nacelle casing 114 for further transport to points within the nacelle 120 of the gas turbine engine 100. While transport of bleed air from the compressor section 104 to the nacelle 120 is described above and herein, the disclosure contemplates transport of other fluids, such as fuels and lubricants and not simply air, from various points within the gas turbine engine 100 to other points within the engine.

Figure 2:
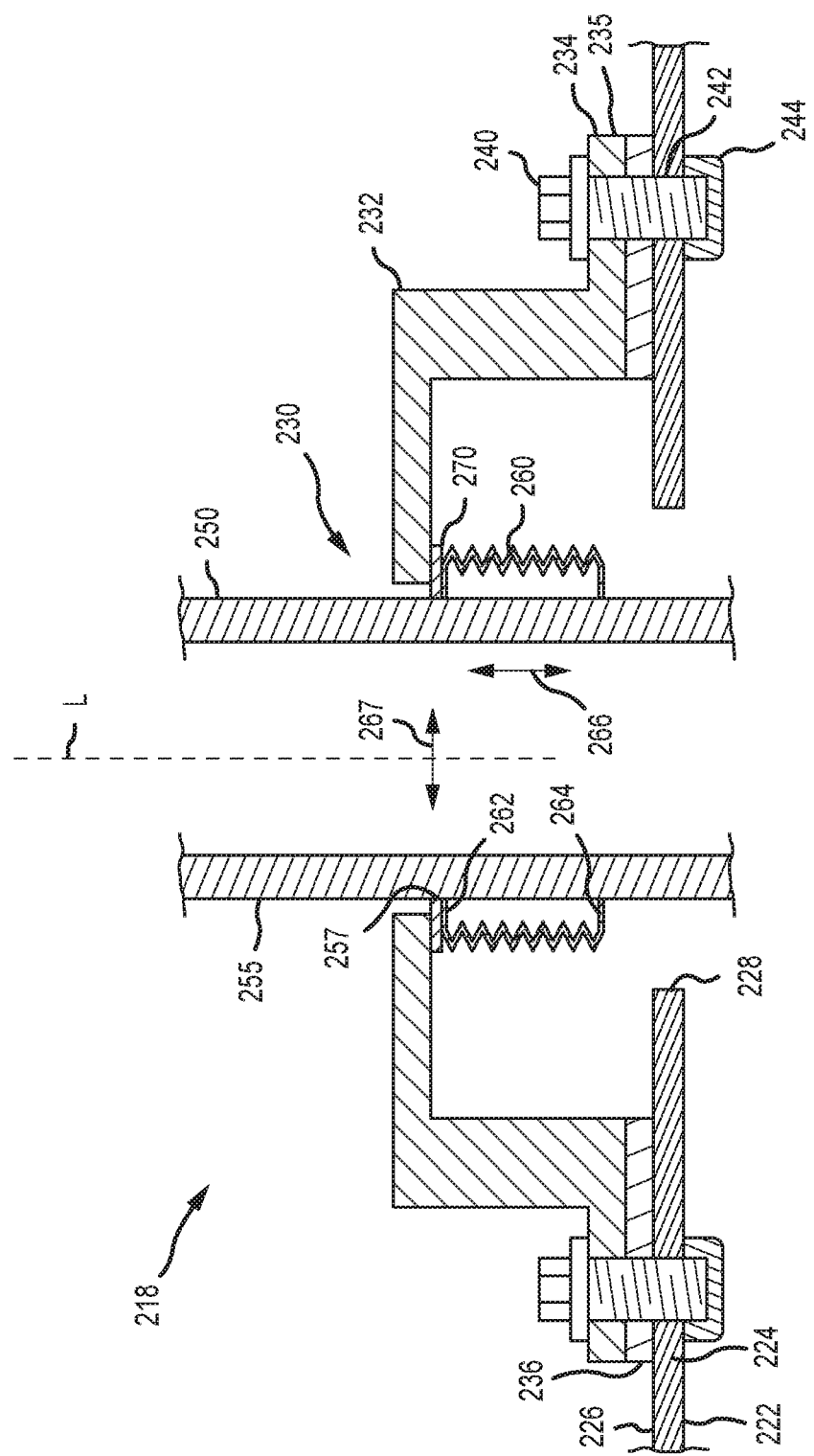
FIG. 2 is a schematic cross sectional view of a transfer tube assembly having a sealing assembly, in accordance with various embodiments.

Referring now to FIG. 2, a transfer tube assembly 218, such as, for example, one of the one or more transfer tube assemblies 118 described above with reference to FIGS. 1A and 1B, is illustrated in schematic cross section. In various embodiments, the transfer tube assembly 218 includes a sealing assembly 230 configured to reduce or minimize leakage of fluid being transported from an inner side 222 of a casing 224 to an outer side 226 of the casing 224. In various embodiments, the transfer tube assembly 218 further includes a fluid transfer tube 250 that typically extends from the inner side 222 of the casing 224 to the outer side 226 of the casing 224 via an aperture 228 that extends through the casing 224. In various embodiments, the fluid transfer tube 250 may float within the sealing assembly 230 or be fixed to structure or componentry existing within a chamber or cavity defined by the inner side 222 of the casing 224.

In various embodiments, the sealing assembly 230 comprises a housing 232 that extends about the fluid transfer tube 250. In various embodiments, the housing 232 includes a flange portion 234 (or one or more tab portions 235) that are used to mount the housing 232 to the casing 224. A base seal 236 is positioned between the housing 232 and the outer side 226 of the casing 224 to provide a seal between the housing 232 and the casing 224. In various embodiments, the housing 232 is secured to the casing via a plurality of bolts 240. In various embodiments, each of the plurality of bolts 240 is received by a corresponding one of a plurality of threaded apertures 242 that are positioned through the casing 224 or that comprise captured nuts 244 positioned on the inner side 222 of the casing 224.

Still referring to FIG. 2, the sealing assembly 230 comprises a bellows 260. In various embodiments, the bellows 260 is positioned about the fluid transfer tube 250 and extends from a first end 262 to a second end 264, spaced a distance along a longitudinal axis L of the fluid transfer tube 250 from the first end 262. In various embodiments, the first end 262 is configured to float with respect to the fluid transfer tube 250 and in various embodiments, the second end 264 is fixed with respect to the fluid transfer tube 250, thereby enabling axial movement of the fluid transfer tube 250 with respect to the housing 232. More specifically, in various embodiments, the bellows 260 enables the fluid transfer tube 250 to translate in a bidirectional direction 266 along the longitudinal axis L in response to thermal deformation or vibratory excitation. In various embodiments, the sealing assembly 230 also comprises a wear surface, such as, for example, a wear ring 270 that may extend circumferentially about the fluid transfer tube 250. In various embodiments, the wear ring 270 may comprise a composite material that is secured to an outer surface 255 of the fluid transfer tube 250 using suitable means, such as a friction fit with an inner surface 257 of the wear ring 270. The wear ring 270 enables the fluid transfer tube 250 to translate in a plane 267 perpendicular to the longitudinal axis L in response to thermal deformation or vibratory excitation. In various embodiments, the first end 262 of the bellows 260 is connected to the wear ring 270.

Figure 3A:
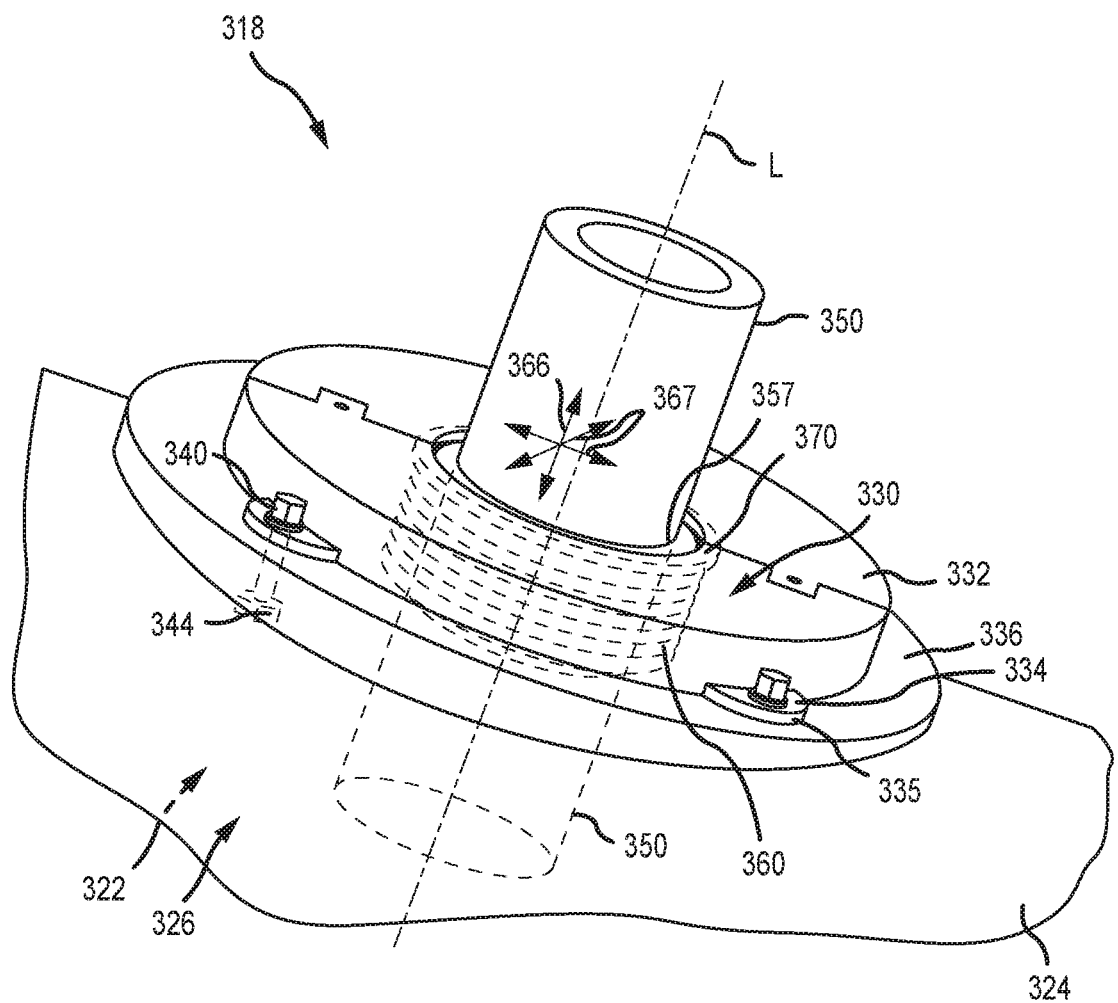
FIGS. 3A and 3B are schematic assembled and exploded views, respectively, of a transfer tube assembly having a sealing assembly, in accordance with various embodiments.
Figure 3B:
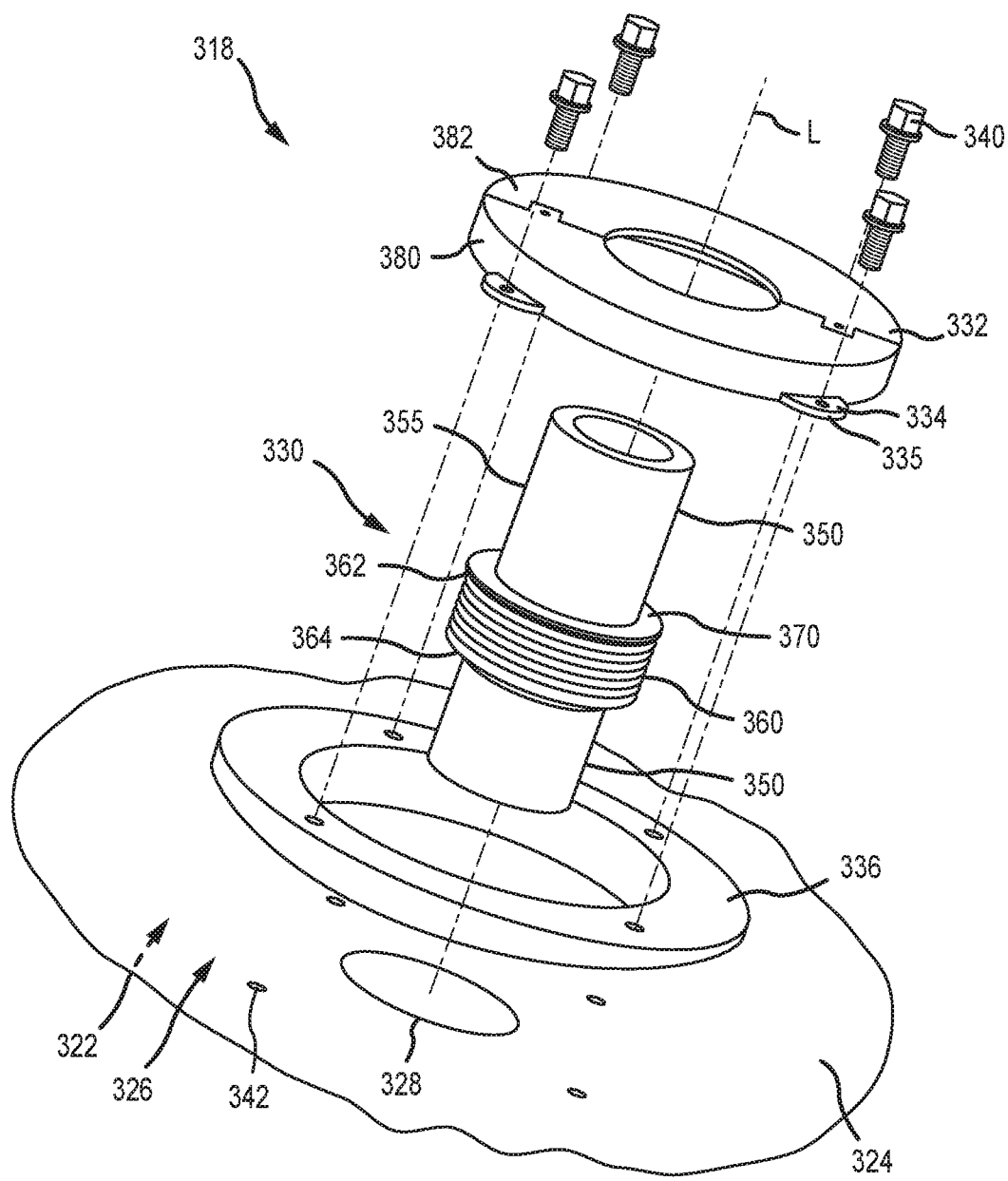

Referring now to FIGS. 3A and 3B, a transfer tube assembly 318, such as, for example, one of the one or more transfer tube assemblies 118 described above with reference to FIGS. 1A and 1B, is illustrated in assembled and exploded form. In various embodiments, the transfer tube assembly 318 includes a sealing assembly 330 configured to reduce or minimize leakage of fluid being transported from an inner side 322 of a casing 324 to an outer side 326 of the casing 324. In various embodiments, the transfer tube assembly 318 further includes a fluid transfer tube 350 that typically extends from the inner side 322 of the casing 324 to the outer side 326 of the casing 324 via an aperture 328 that extends through the casing 324. In various embodiments, the fluid transfer tube 350 may float within the sealing assembly 330 or be fixed to structure or componentry existing within a chamber or cavity defined by the inner side 322 of the casing 324.

In various embodiments, the sealing assembly 330 comprises a housing 332 that extends about the fluid transfer tube 350. In various embodiments, the housing 332 includes a flange portion 334 (or one or more tab portions 335) that are used to mount the housing 332 to the casing 324. A base member 336 is positioned between the housing 332 and the outer side 326 of the casing 324 to provide a seal between the housing 332 and the casing 324. In various embodiments, the housing 332 is secured to the casing via a plurality of bolts 340. In various embodiments, each of the plurality of bolts 340 is received by a corresponding one of a plurality of threaded apertures 342 that are positioned through the casing 324 or that comprise captured nuts 344 positioned on the inner side 322 of the casing 324.

Still referring to FIGS. 3A and 3B, the sealing assembly 330 comprises a bellows 360. In various embodiments, the bellows 360 is secured to the fluid transfer tube 350 at a first attachment point 362 and at a second attachment point 364, spaced a distance along a longitudinal axis L of the fluid transfer tube 350 from the first attachment point 362. The bellows 360 enables the fluid transfer tube 350 to translate in a bidirectional direction 366 along the longitudinal axis L in response to thermal deformation or vibratory excitation. In various embodiments, the bellows 360 is constructed from a molded rubber or elastomeric material, such as, for example, a nitrile rubber, having a high resistance to degradation from heat and from contact with oils, fuels and other chemicals, or from a metallic material, such as, for example, an alloy of aluminum or titanium. In various embodiments, the sealing assembly 330 also comprises a wear surface, such as, for example, a wear ring 370 that may extend circumferentially about the fluid transfer tube 350. In various embodiments, the wear ring 370 may comprise a composite material that is secured to an outer surface 355 of the fluid transfer tube 350 using suitable means, such as a friction fit with an inner surface 357 of the wear ring 370. The wear ring 370 enables the fluid transfer tube 350 to translate in a plane 367 perpendicular to the longitudinal axis L in response to thermal deformation or vibratory excitation.

To assemble the sealing assembly 330 and, hence, the transfer tube assembly 318, the bellows 360 and wear ring 370, to the extent not pre-manufactured with the fluid transfer tube 350, are secured to the fluid transfer tube 350, using suitable means, such as, for example, friction fit with the outer surface 355 of the fluid transfer tube 350. The base member 336 may then be positioned over the fluid transfer tube 350 and about the outer side 326 of the casing 324, followed by the housing 332. The plurality of bolts 340 are then threaded into corresponding ones of the plurality of threaded apertures 242 that are positioned through the casing 224 or that comprise captured nuts 244 positioned on the inner side 222 of the casing 224. In various embodiments, the housing 332 may comprise a unitary, monolithic piece of material or, in various embodiments, may comprise multi-piece construction such as, for example, a first section 380 and a second section 382. In various embodiments, the multi-piece construction is advantageous in that the housing 332 may be removed and replaced while the fluid transfer tube 350 remains connected to its upstream and downstream componentry.

When constructed and assembled as above described, the bellows 360 and the wear ring 370, constructed of flexible and wear resistant materials, such as, for example, the molded rubber or elastomeric materials for the bellows 360 and the composite materials described for the wear ring 370, will provide sufficient flexibility to enable the fluid transfer tube 350 to translate in three dimensions with respect to the casing 324 in response to vibratory loads, high temperatures or differential thermal growth. Thus, the transfer tube assembly 318 may experience axial, radial or circumferential deflections, due to various thermal or mechanical sources, for longer periods of time or accumulated cycles of use without the fluid transfer components experiencing material fatigue.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A seal assembly for a fluid transfer tube in a gas turbine engine,
    comprising:
    a base member having a first side configured to mate with a casing and a second side opposite the first side;
    a housing configured to mate with the second side of the base member and to surround a portion of the fluid transfer tube;
    a bellows surrounding the fluid transfer tube and positioned between the housing and the casing; and
    a wear ring disposed between the housing and the bellows,
        wherein the fluid transfer tube defines a longitudinal axis and wherein the bellows is positioned about the fluid transfer tube and extends from a first end to a second end spaced a distance along the longitudinal axis from the first end and
        wherein the first end is configured to float with respect to the fluid transfer tube and wherein the second end is fixed with respect to the fluid transfer tube.

2. The seal assembly of claim 1, wherein the first end is connected to the wear ring.

3. The seal assembly of claim 1, wherein the bellows is constructed of an elastomeric or a metallic material.

4. The seal assembly of claim 1, wherein the wear ring is constructed of a composite material and includes a surface configured to wear against the housing.

5. The seal assembly of claim 1, wherein both the base member and the housing include a plurality of holes extending there through and configured for attaching the base member and the housing to the casing via a plurality of bolts.

6. The seal assembly of claim 1, wherein the housing includes a first section configured to house a first portion of the fluid transfer tube and a second section configured to house a second portion of the fluid transfer tube.

7. The seal assembly of claim 1, wherein the base member is constructed of an elastomeric or a metallic material.

8. A transfer tube assembly for a gas turbine engine, comprising:
    a fluid transfer tube configured to extend through a casing;
    a base member having a first side configured to mate with the casing and a second side opposite the first side;
    a housing configured to mate with the second side of the base member and to surround a portion of the fluid transfer tube;
    a bellows surrounding the fluid transfer tube and positioned between the housing and the casing; and
    a wear ring disposed between the housing and the bellows,
        wherein the fluid transfer tube defines a longitudinal axis and wherein the bellows is positioned about the fluid transfer tube and extends from a first end to a second end spaced a distance along the longitudinal axis from the first end and
        wherein the first end is configured to float with respect to the fluid transfer tube and wherein the second end is fixed with respect to the fluid transfer tube.

9. The transfer tube assembly of claim 8, wherein the first end is connected to the wear ring.

10. The transfer tube assembly of claim 9, wherein the housing includes a first section configured to house a first side of the fluid transfer tube and a second section configured to house a second side of the fluid transfer tube.

11. A bleed air assembly for a gas turbine engine, comprising:
    a fluid transfer tube configured to provide compressed air from a compressor to a component external to the compressor, the fluid transfer tube having a tube portion configured to extend through a casing;
    a base member having a first side configured to mate with the casing and a second side opposite the first side;
    a housing configured to mate with the second side of the base member and to surround a portion of the fluid transfer tube;
    a bellows surrounding the fluid transfer tube and positioned between the housing and the casing; and
    a wear ring disposed between the housing and the bellows,
        wherein the bellows and the wear ring are configured to enable movement of the tube portion with respect to the casing,
        wherein the fluid transfer tube defines a longitudinal axis and wherein the bellows is positioned about the fluid transfer tube and extends from a first end to a second end spaced a distance along the longitudinal axis from the first end and
        wherein the first end is configured to float with respect to the fluid transfer tube and wherein the second end is fixed with respect to the fluid transfer tube.

12. The bleed air assembly of claim 11, wherein the first end is connected to the wear ring.

13. The bleed air assembly of claim 11, wherein the housing includes a first section configured to house a first side of the fluid transfer tube and a second section configured to house a second side of the fluid transfer tube.

* * * * *